United States Patent
Lee et al.

(10) Patent No.: US 10,620,756 B2
(45) Date of Patent: Apr. 14, 2020

(54) DISPLAY APPARATUS

(71) Applicant: SAMSUNG DISPLAY CO., LTD., Yongin-si, Gyeonggi-do (KR)

(72) Inventors: Hyesog Lee, Osan-si (KR); Jaejoong Kwon, Suwon-si (KR); Yunseon Do, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 460 days.

(21) Appl. No.: 15/058,013

(22) Filed: Mar. 1, 2016

(65) Prior Publication Data

US 2017/0020014 A1    Jan. 19, 2017

(30) Foreign Application Priority Data

Jul. 13, 2015    (KR) .................. 10-2015-0099364

(51) Int. Cl.
| | |
|---|---|
| *H05K 5/03* | (2006.01) |
| *G02B 5/00* | (2006.01) |
| *G06F 3/044* | (2006.01) |
| *G06F 3/041* | (2006.01) |
| *G02F 1/1333* | (2006.01) |

(52) U.S. Cl.
CPC ............ *G06F 3/044* (2013.01); *G06F 3/0416* (2013.01); *G02F 2001/133331* (2013.01)

(58) Field of Classification Search
CPC ...... G06F 3/044; G06F 3/0416; G06F 3/0412; G06F 1/1637; G02F 1/13; G02F 1/133308; G02F 1/133512; G02F 1/1637; G02F 2001/133331; G02B 5/003; H05K 5/03

See application file for complete search history.

(56) References Cited

U.S. PATENT DOCUMENTS

| | | | |
|---|---|---|---|
| 2007/0201234 A1 | 8/2007 | Ottermann | |
| 2010/0259829 A1* | 10/2010 | Kim | ..................... G02B 27/026 359/609 |
| 2012/0075838 A1 | 3/2012 | Lee et al. | |
| 2012/0098551 A1 | 4/2012 | Tsukamoto | |

(Continued)

FOREIGN PATENT DOCUMENTS

| | | | |
|---|---|---|---|
| KR | 20140079756 A | * | 6/2014 |
| KR | 10-1480672 B1 | | 1/2015 |

(Continued)

OTHER PUBLICATIONS

English translation of Korian document (KR 10-2014-0079756).*

(Continued)

*Primary Examiner* — William R Alexander
*Assistant Examiner* — Ephrem Z Mebrahtu
(74) *Attorney, Agent, or Firm* — Lewis Roca Rothgerber Christie LLP (57) ABSTRACT

A display apparatus includes a display panel, a window on the display panel including a display part and a non-display part surrounding the display part, and a decoration layer under the non-display part. A lower surface of the non-display part includes a slant surface inclined at a predetermined angle from an outer lower edge of the window towards a portion of the lower surface of the non-display part adjacent to a boundary between the display part and the non-display part.

14 Claims, 8 Drawing Sheets

(56) References Cited

U.S. PATENT DOCUMENTS

| | | | |
|---|---|---|---|
| 2012/0147299 A1* | 6/2012 | Park | G02F 1/133528 349/96 |
| 2013/0082961 A1* | 4/2013 | Wang | G06F 3/044 345/173 |
| 2014/0021499 A1 | 1/2014 | Jang | |
| 2014/0145979 A1 | 5/2014 | Lee | |
| 2014/0315463 A1 | 10/2014 | Khachatryan | |
| 2014/0339517 A1 | 11/2014 | Park et al. | |
| 2015/0077368 A1* | 3/2015 | Chen | G06F 3/0416 345/173 |
| 2015/0117055 A1* | 4/2015 | Chen | G02B 6/0093 362/611 |
| 2015/0301652 A1* | 10/2015 | Yang | G06F 3/044 345/174 |
| 2016/0011704 A1* | 1/2016 | Chiu | G06F 1/1643 345/173 |
| 2016/0238747 A1* | 8/2016 | Huang | G02B 3/08 |
| 2017/0336668 A1* | 11/2017 | Xu | G02F 1/133308 |

FOREIGN PATENT DOCUMENTS

| | | |
|---|---|---|
| KR | 10-2015-0019251 A | 2/2015 |
| KR | 10-2015-0039539 A | 4/2015 |
| KR | 10-2016-0148102 | 12/2016 |
| KR | 10-2017-0000030 | 1/2017 |
| KR | 10-2017-0001844 | 1/2017 |

OTHER PUBLICATIONS

Abstract for Korean Publication No. 10-2014-0079756, Jun. 27, 2014 Corresponding to Korean Patent No. 10-1480672 B1, Jan. 14, 2015, 1 Page.

* cited by examiner

DISPLAY APPARATUS

CROSS-REFERENCE TO RELATED APPLICATION

This application claims priority to and the benefit of Korean Patent Application No. 10-2015-0099364, filed on Jul. 13, 2015, the entire content of which is incorporated herein by reference.

BACKGROUND

1. Field

The present disclosure relates to a display apparatus.

2. Description of the Related Art

Electronic equipment, such as smart phones, digital cameras, notebook computers, navigation devices, smart televisions, and the like, include a display apparatus to display an image. The display apparatus includes a display panel that generates and displays the image and a window layer on the display panel to protect the display panel.

Various display panels, such as liquid crystal display panels, organic light emitting display panels, electrowetting display panels, electrophoretic display panels, and the like, have been developed for use as the display panel.

The display panel has a touch function therein. For instance, smart phones include a display panel with a touch panel on the display panel and a window layer on the touch panel. An input signal generated by a user's touch on the touch panel is applied to the display panel. The display panel provides a user with the image corresponding to the input signal.

The image generated by the display panel is provided to the user through the window layer. The window layer includes a display area for displaying the image and a non-display area surrounding the display area. A decoration layer is in the non-display area of the window layer. The non-display area is designed to have various colors based on the colors of the decoration layer.

SUMMARY

The present disclosure provides a display apparatus capable of preventing or reducing a light leakage phenomenon.

Embodiments of the inventive concept provide a display apparatus including a display panel, a window on the display panel including a display part and a non-display part surrounding the display part, and a decoration layer under the non-display part. A lower surface of the non-display part includes a slant surface inclined from an outer lower edge of the window towards a portion of the lower surface of the non-display part adjacent to a boundary between the display part and the non-display part.

The decoration layer is substantially parallel to the slant surface.

The display apparatus further includes a base substrate under the window and a first adhesive member attaching the base substrate to the window. The decoration layer is under the base substrate to overlap with the non-display part.

The base substrate has flexibility.

The first adhesive member is on a lower surface of the window and has a uniform thickness. The base substrate has substantially the same shape as the lower surface of the window and is attached to the lower surface of the window.

The window has a refractive index that is greater than a refractive index of the first adhesive member.

A portion of the first adhesive member overlapped with the non-display part and an area of the base substrate have substantially the same shape as the slant surface of the lower surface of the non-display part.

The display apparatus further includes a second adhesive member under the decoration layer and the base substrate. The display panel is attached to the decoration layer and the base substrate by the second adhesive member.

The second adhesive member has a lower surface that is flat.

Each of the first and second adhesive members is an optical clear adhesive.

The display apparatus further includes a light absorbing wall on an outer side surface of the window, the base substrate, the decoration layer, and the first and second adhesive members.

The light absorbing wall includes a resin having a black color.

Embodiments of the display apparatus further include a touch panel on the display panel. The touch panel is attached to the decoration layer and the base substrate by the second adhesive member.

Embodiments of the inventive concept provide a display apparatus including a display panel, a window on the display panel including a display part and a non-display part surrounding the display part, and a decoration layer under the non-display part. A lower surface of the non-display part has a curved surface shape protruding in a lower direction of the lower surface of the non-display part. A height of the lower surface of the non-display part becomes gradually higher as a distance from an edge of the lower surface of the non-display part increases and a distance from the display part decreases.

Embodiments of the inventive concept provide a display apparatus including a display panel, a window on the display panel including a display part and a non-display part surrounding the display part, and a decoration layer under the non-display part. A lower surface of the non-display part includes a planar surface portion having a flat shape and a curved surface portion between the planar surface portion and the display part. The curved surface portion has a curved shape protruding in a lower direction of the curved surface portion. A height of the curved surface portion becomes gradually higher from an outer side of the curved surface portion towards an inner side of the curved surface portion adjacent to the display part.

According to the embodiments above, the display apparatus reduces the amount of light traveling to the decoration layer of the non-display area, and thus the light leakage phenomenon may be prevented from occurring or may be reduced.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. When an element is referred to as being "directly on," "directly connected to" or "directly coupled to" another element or layer, there are no intervening elements or layers present. Like reference numbers refer to like elements throughout. As used herein, the term "and/or" includes any and all combinations of one or more of the associated listed items.

It will be understood that, although the terms first, second, and the like may be used herein to describe various elements, components, regions, layers and/or sections, these elements, components, regions, layers and/or sections are not limited by these terms. These terms are used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments and is not intended to be limiting of the invention. As used herein, the singular forms "a" and "an" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. As used herein, the term "substantially" and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." Also, the term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
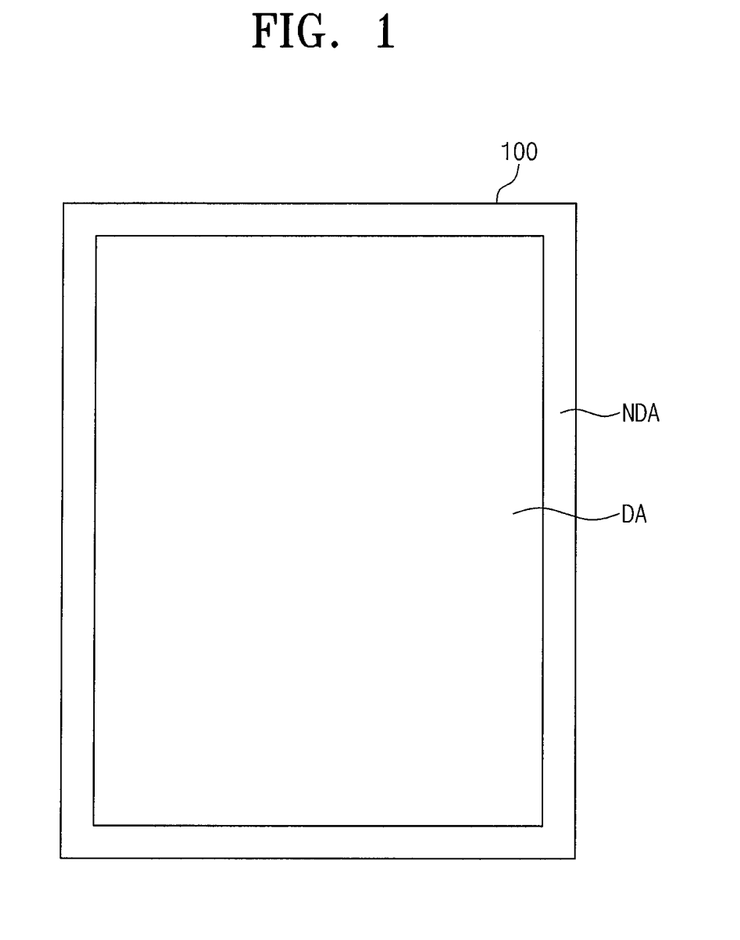
FIG. 1 is a view showing areas of a display apparatus according to a first exemplary embodiment of the present disclosure.

FIG. 1 is a view showing areas of a display apparatus 100 according to a first exemplary embodiment of the present disclosure.

Referring to FIG. 1, the display apparatus 100 includes a display area DA and a non-display area NDA surrounding the display area DA when viewed in a plan view. The display area DA displays an image provided to a user. The image is not displayed in the non-display area NDA.

A plurality of pixels (not shown) for displaying the image is arranged in the display area DA. The non-display area NDA may have a black color (e.g., by being printed in a black color), but the color of the non-display area NDA should not be limited to black. That is, the non-display area NDA may have various colors (e.g., by printing using various colors).

Figure 2:
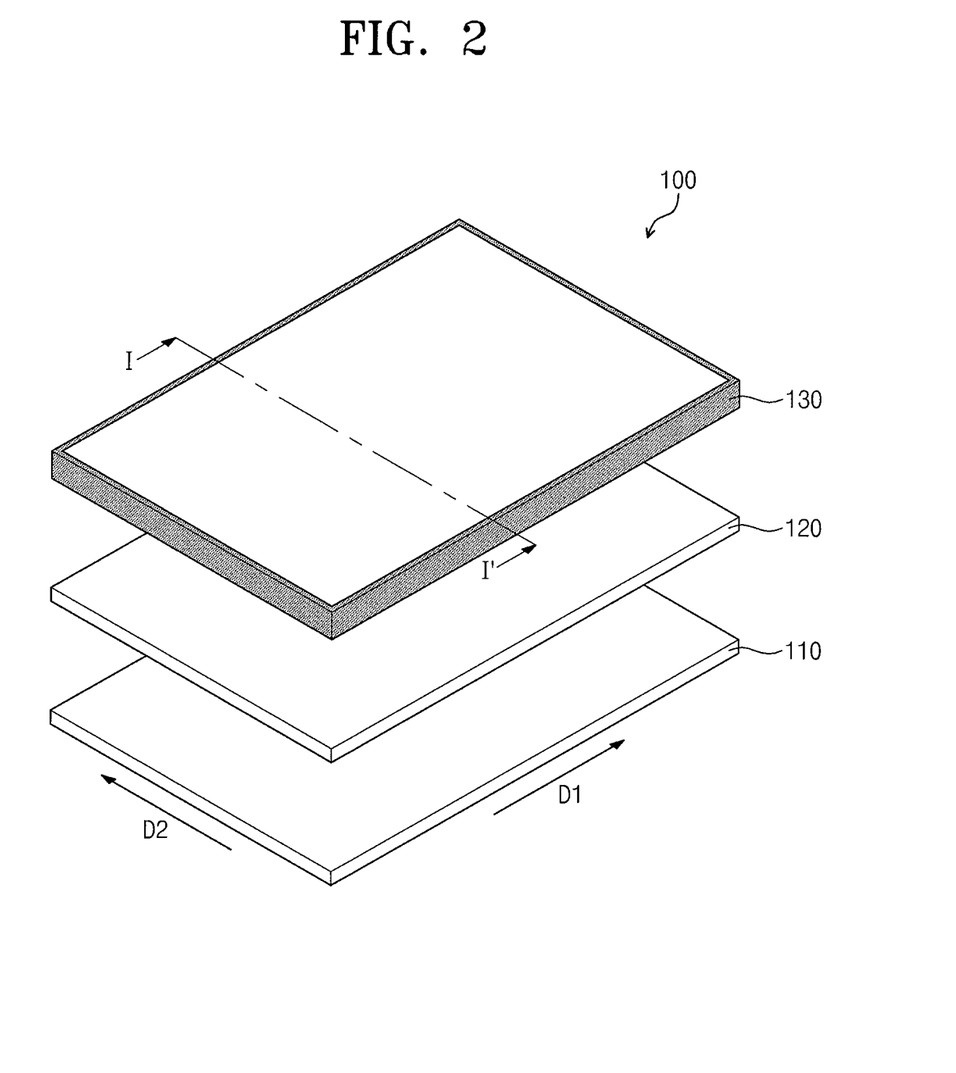
FIG. 2 is an exploded perspective view showing a display apparatus according to the first exemplary embodiment of the present disclosure.

FIG. 2 is an exploded perspective view showing the display apparatus 100 according to the first exemplary embodiment of the present disclosure.

Referring to FIG. 2, the display apparatus 100 includes a display panel 110, a touch panel 120 on the display panel 110, and a window layer 130 on the touch panel 120. The display panel 110, the touch panel 120, and the window layer 130 have a long side in a first direction D1 and a short side in a second direction D2.

The display panel 110 may be an organic light emitting display panel including organic light emitting elements, but is not limited thereto or thereby. That is, various display panels, such as a liquid crystal display panel including a liquid crystal layer, an electrowetting display panel including an electrowetting layer, an electrophoretic display panel including an electrophoretic layer, and the like, may be used as the display panel 110.

The display panel 110 generates an image. The image generated by the display panel 110 is provided to the user after passing through the touch panel 120 and the window layer 130.

The touch panel 120 may be attached to the display panel 110 by an adhesive member (not shown). The touch panel 120 senses an input from an input device (such as a human finger, a touch pen, and/or the like) making contact with a screen of the touch panel 120 and converts the contact position input into an electrical signal.

The touch panel 120 may be a resistive overlay type touch panel, a capacitive overlay type touch panel, a surface acoustic wave type touch panel, or an infrared type touch panel. In the present exemplary embodiment, the touch panel 120 may be the capacitive overlay type touch panel as a representative example. The capacitive overlay type touch panel 120 includes a plurality of sensing electrodes (not shown).

The capacitive overlay type touch panel 120 senses a variation in capacitance between the sensing electrodes when the human finger or the touch pen makes contact with the screen of the capacitive overlay type touch panel 120 and converts the contact position input into an electrical signal. The electrical signal is provided to the display panel 110 as an input signal and the display panel 110 displays an image (e.g., a predetermined image) in response to the input signal.

The window layer 130 may be attached to the touch panel 120 by an adhesive member (not shown). The window layer 130 protects the touch panel 120 from external scratches. The touch panel 120 may be omitted, for example, in cases where the display apparatus 100 does not include a touch function. In some embodiments, a touch panel may be integrated with a display panel.

Figure 3:
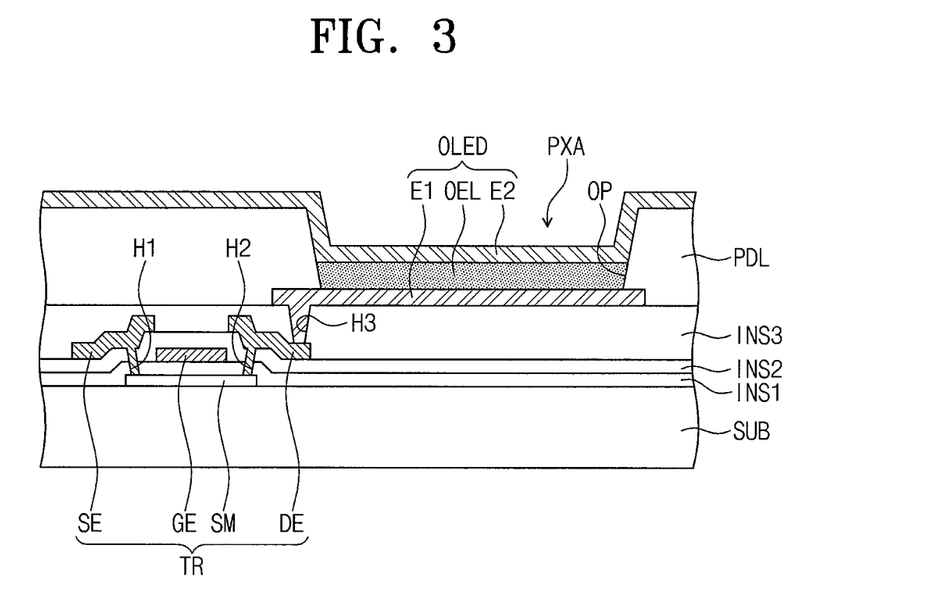
FIG. 3 is a cross-sectional view showing a cross-section of one pixel on a display panel.

FIG. 3 is a cross-sectional view showing a cross-section of one pixel on the display panel.

For the convenience of explanation, FIG. 3 shows only one pixel PX, but it should be understood that a plurality of pixels may be arranged in the display area DA of the display panel 110. As an example, FIG. 3 shows a configuration of the pixel PX of the display panel 110 in the case where the display panel 110 is an organic light emitting display panel.

Referring to FIG. 3, the pixel PX includes a light emitting element OLED and a transistor TR coupled to the light emitting element OLED. The light emitting element OLED may be, but is not limited to, an organic light emitting diode OLED.

In detail, the transistor TR is on a substrate SUB. The substrate SUB may be, but is not limited to, a glass substrate or a transparent flexible substrate formed of plastic. In the case that the substrate SUB is a flexible substrate, the display panel 110 may be a flexible display panel having flexibility.

A semiconductor layer SM of the transistor TR is on the substrate SUB. The semiconductor layer SM includes an inorganic semiconductor material, e.g., amorphous silicon, polysilicon, and/or the like, and/or an organic semiconductor material. In addition, the semiconductor layer SM may include an oxide semiconductor. Although not shown in FIG. 3, the semiconductor layer SM includes a source region, a drain region, and a channel region between the source area and the drain area.

A first insulating layer INS1 is on the substrate SUB to cover the semiconductor layer SM. The first insulating layer INS1 may be, but is not limited to, an inorganic insulating layer including an inorganic material. A gate electrode GE of the transistor TR is on the first insulating layer INS1 to overlap with the semiconductor layer SM. The gate electrode GE overlaps with the channel area of the semiconductor layer SM.

A second insulating layer INS2 is on the first insulating layer INS1 to cover the gate electrode GE. The second insulating layer INS2 may be referred to as an inter-insulating layer. The second insulating layer INS2 may be, but is not limited to, an inorganic insulating layer including an inorganic material.

A source electrode SE and a drain electrode DE of the transistor TR are on the second insulating layer INS2 to be spaced apart from each other. The source electrode SE is coupled to the source region of the semiconductor layer SM through a first contact hole H1 formed through the first and second insulating layers INS1 and INS2. The drain electrode DE is coupled to the drain region of the semiconductor layer SM through a second contact hole H2 formed through the first and second insulating layers INS1 and INS2.

A third insulating layer INS3 is on the second insulating layer INS2 to cover the source electrode SE and the drain electrode DE. The third insulating layer INS3 may be, but is not limited to, an organic insulating layer including an organic material.

A first electrode E1 of the light emitting element OLED is on the third insulating layer INS3. The first electrode E1 is coupled to the drain electrode DE of the transistor TR through a third contact hole H3 formed through the third insulating layer INS3. The first electrode E1 may be referred to as a pixel electrode or an anode electrode. The first electrode E1 includes a transmissive electrode (e.g., an electrode that passes light) and/or a reflective electrode (e.g., an electrode that reflects light).

A pixel definition layer PDL is on the first electrode E1 and the third insulating layer INS3 to expose an area (e.g., a predetermined area) of the first electrode E1. The pixel definition layer PDL includes an opening through which the area (e.g., the predetermined area) of the first electrode E1 is exposed. The area corresponding to the opening OP may be referred to as a pixel area.

An organic light emitting layer OEL is on the first electrode E1 in the opening OP. The organic light emitting layer OEL includes an organic material for emitting light having a red, green, or blue color. Accordingly, the organic light emitting layer OEL emits a red light, a green light, or a blue light, but should be understood to not be limited thereto or thereby. That is, the organic light emitting layer OEL may emit a white light by a combination of organic materials generating red, green, and blue lights, respectively.

The organic light emitting layer OEL may include a low molecular weight organic material or a high molecular weight organic material. Although not shown in the figures, the organic light emitting layer OEL may have a multi-layer structure, including a hole injection layer (HIL), a hole transport layer (HTL), an emission layer EML, an electron transport layer (ETL), and/or an electron injection layer (EIL).

As an example of the multi-layer structure, the hole injection layer may be on the first electrode E1 and the hole transport layer, the emission layer, the electron transport layer, and the electron injection layer may be sequentially stacked on the hole injection layer.

A second electrode E2 is on the pixel definition layer PDL and the organic light emitting layer OEL. The second electrode E2 may be referred to as a common electrode or a cathode electrode. The second electrode E2 includes a transmissive electrode and/or a reflective electrode.

In the case that the display panel 110 is a front surface light emitting type (i.e., top emission type) organic light emitting display panel, the first electrode E1 is a reflective electrode and the second electrode E2 is a transmissive electrode. In the case that the display panel 110 is a rear surface light emitting type (i.e., bottom emission type) organic light emitting display panel, the first electrode E1 is a transmissive electrode and the second electrode E2 is a reflective electrode.

The light emitting element OLED is in the pixel area PXA and includes the first electrode E1, the organic light emitting layer OEL, and the second electrode E2 in the pixel area PXA. The first electrode E1 is a positive electrode corresponding to a hole injection layer and the second electrode E2 is a negative electrode corresponding to an electron injection layer.

In order to allow the organic light emitting layer OEL of the light emitting element OLED to emit light, a first source voltage is applied to the first electrode E1 and a second source voltage having a polarity opposite to that of the first source voltage is applied to the second electrode E2 by the transistor TR.

Holes and electrons injected into the organic light emitting layer OEL are recombined in the organic light emitting layer OEL to generate excitons, and the light emitting element OLED emits light by the excitons that return to a ground state from an excited state. Accordingly, the light emitting element OLED emits the red light, the green light, and/or the blue light according to a current flow, thereby displaying an image (e.g., predetermined image information).

Figure 4:
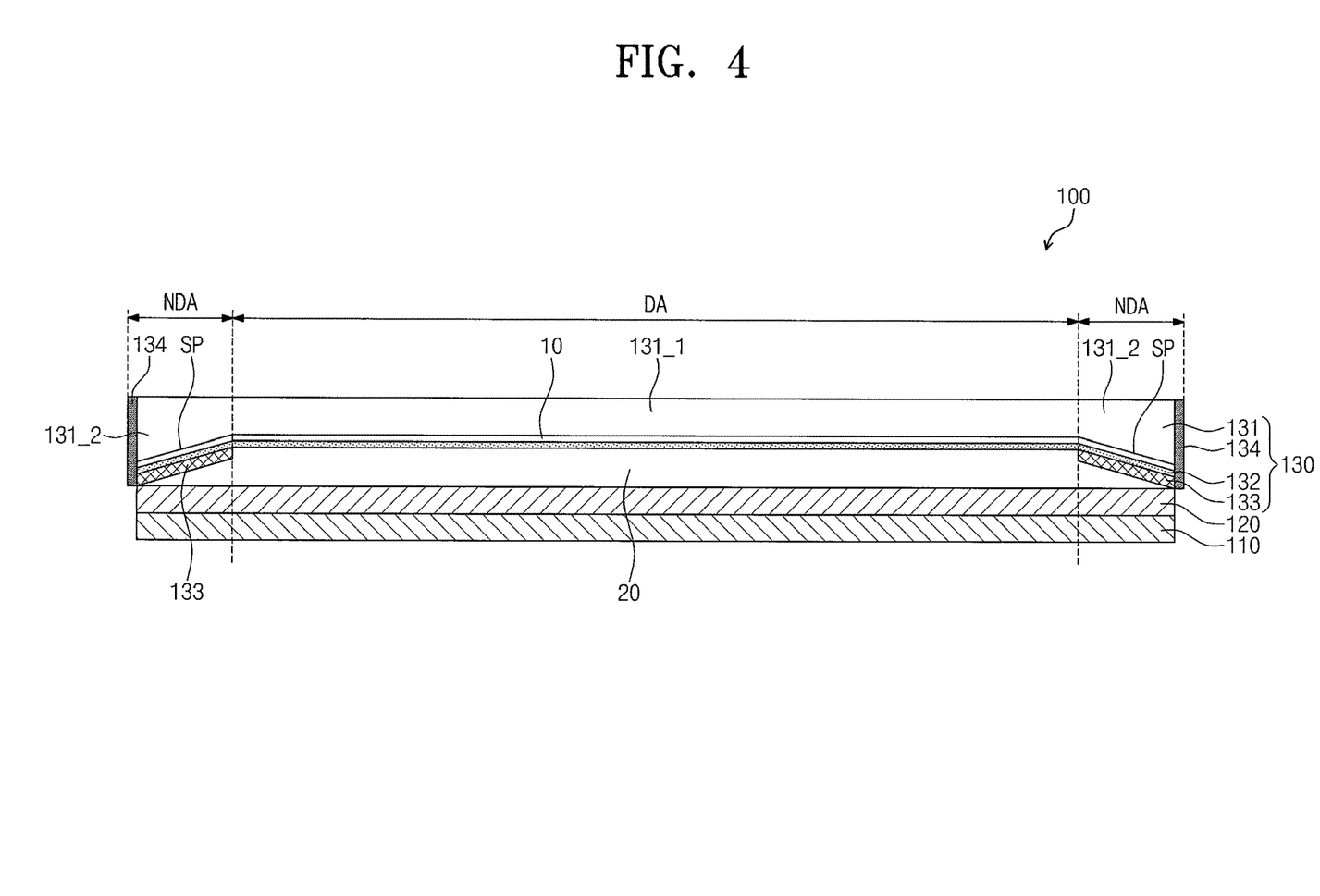
FIG. 4 is a cross-sectional view taken along the line I-I' in FIG. 2.

FIG. 4 is a cross-sectional view taken along the line I-I' in FIG. 2.

Referring to FIG. 4, the touch panel 120 is on the display panel 110 and the window layer 130 is on the touch panel 120. The window layer 130 includes a window 131, a base substrate 132, a decoration layer 133, a light absorbing wall 134, a first adhesive member 10, and a second adhesive member 20.

The window 131 includes a glass or transparent plastic material. The window 131 includes a display part 131_1 and a non-display part 131_2 surrounding the display part 131_1. The display part 131_1 is in the display area DA. The non-display part 131_2 is in the non-display area NDA.

The display part 131_1 has a flat shape. A lower surface of the non-display part 131_2 has a slant surface SP with respect to the display part 131_1.

In detail, an upper surface of the display part 131_1 is at the same height as that of an upper surface of the non-display part 131_2. Therefore, the upper surface of the display part 131_1 and the upper surface of the non-display part 131_2 are located at the same height.

The lower surface of the non-display part 131_2 includes a slant surface SP, which may be inclined at a predetermined angle. The slant surface SP extends from an outer lower edge of the window 131 towards a portion of the lower surface of the non-display part 131_2 adjacent to a boundary between the display part 131_1 and the non-display part 131_2. Thus, the portion of the lower surface of the non-display part 131_2 adjacent to the boundary between the display part 131_1 and the non-display part 131_2 is located at a position higher than the portion of the lower surface of the non-display part 131_2 adjacent to the outside of the window 131.

The base substrate 132 is under the window 131. The first adhesive member 10 is between the window 131 and the base substrate 132. The base substrate 132 is attached to a lower surface of the window 131 by the first adhesive member 10.

The first adhesive member 10 is on the lower surface of the window 131 and has a uniform thickness. The base substrate 132 may be, but is not limited to, a flexible substrate having flexibility. The base substrate 132 has substantially the same shape as the lower surface of the window 131 and is attached to the lower surface of the window 131.

The first adhesive member 10 and the base substrate 132 have a flat shape in the display area DA. Areas of the first adhesive member 10 and the base substrate 132 that overlap with the non-display part 131_2 have substantially the same slant surface SP as the lower surface of the non-display part 131_2.

The decoration layer 133 is under the base substrate 132 in the non-display area NDA. The decoration layer 133 overlaps with the non-display part 131_2. Since the decoration layer 133 is substantially parallel to the slant surface SP, the decoration layer 133 is slanted in the non-display area NDA. The decoration layer 133 may have various colors. The non-display area NDA overlapped with the non-display part 131_2 may be designed to have various colors based on the colors of the decoration layer 133.

The second adhesive member 20 is under the decoration layer 133 and the base substrate 132. The second adhesive member 20 has a lower surface that is flat.

The touch panel 120 is attached to the base substrate 132 and the decoration layer 133 by the second adhesive member 20. That is, the second adhesive member 20 is between the window layer 130 and the touch panel 120 and the touch panel 120 is attached to the lower portion of the window layer 130 by the second adhesive member 20. In the case where the touch panel 120 is not used, the display panel 110 may be attached to the lower portion of the window layer 130 by the second adhesive member 20.

The first and second adhesive members 10 and 20 may be, but are not limited to, an ultraviolet ray curing resin. The first and second adhesive members 10 and 20 may be an optical clear adhesive (OCA).

The light absorbing wall 134 is on outer side surfaces of the window 131, the base substrate 132, the decoration layer 133, and the first and second adhesive members 10 and 20. The light absorbing wall 134 forms a side surface of the window layer 130. The light absorbing wall 134 includes a resin having a black color. The light absorbing wall 134 absorbs light.

Figure 5A:
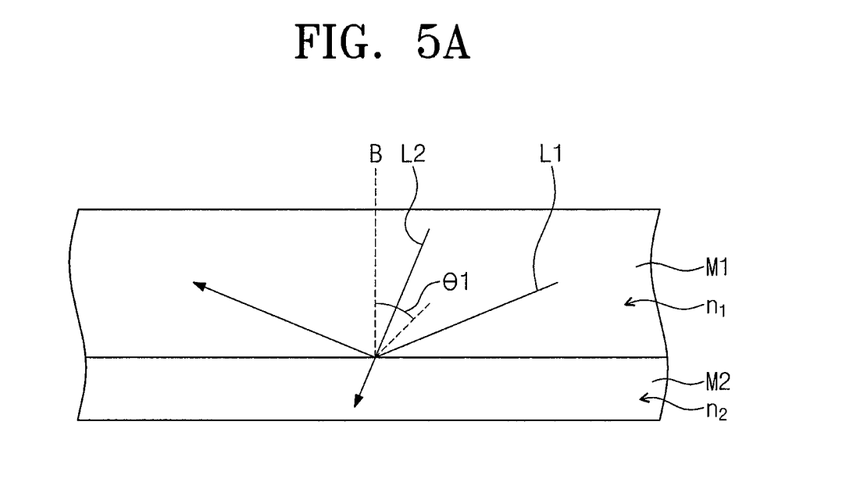
FIGS. 5A and 5B are views illustrating a total reflection.
Figure 5B:
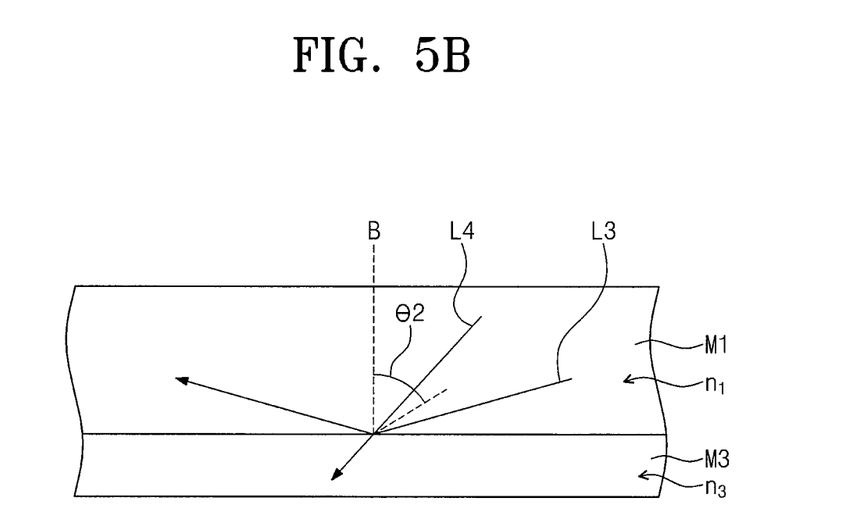

FIGS. 5A and 5B are views explaining a total reflection.

Referring to FIGS. 5A and 5B, a first material layer M1 has a first refractive index $n_1$. A second material layer M2 has a second refractive index $n_2$ and is under the first material layer M1 (e.g., see FIG. 5A). A third material layer M3 has a third refractive index $n_3$ and is under the first material layer M1 (e.g., see FIG. 5B).

The first refractive index $n_1$ is greater than the second refractive index $n_2$ and is also greater than the third refractive index $n_3$. A difference between the first and second refractive indices $n_1$ and $n_2$ is greater than a difference between the first and third refractive indices $n_1$ and $n_3$.

According to Snell's law, a total reflection is a phenomenon in which a light is totally reflected from an interface between two materials having different refractive indices and occurs when the light travels to a material having a relatively small refractive index from a material having a relatively large refractive index and an incident angle of the light is greater than a critical angle.

The incident angle of the light is defined by an angle between a normal line B substantially vertical to the interface between the two materials and a direction in which the light travels (e.g., see FIGS. 5A and 5B). The critical angle corresponds to an angle that the light is totally reflected with respect to the normal line B in the material having the relatively large refractive index.

As the difference in refractive index between the two materials decreases, the critical angle increases, and as the difference in refractive index between the two materials increases, the critical angle decreases. For instance, as shown in FIG. 5A, the critical angle according to the difference between the first and second refractive indices $n_1$ and $n_2$ in the first material layer M1 is set to a first angle $\theta 1$. As shown in FIG. 5B, the critical angle according to the difference between the first and third refractive indices $n_1$ and $n_3$ in the first material layer M1 is set to a second angle $\theta 2$.

Because the difference between the first and second refractive indices $n_1$ and $n_2$ is greater than the difference between the first and third refractive indices $n_1$ and $n_3$, the first angle $\theta 1$ is smaller than the second angle $\theta 2$.

As shown in FIG. 5A, a first light L1 having the incident angle greater than the first angle $\theta 1$ is totally (or substantially totally) reflected at the interface between the first and second material layers M1 and M2. A second light L2 having the incident angle smaller than the first angle $\theta 1$ transmits through the second material layer M2.

As shown in FIG. 5B, a third light L3 having the incident angle greater than the second angle $\theta 2$ is totally (e.g., substantially totally) reflected at the interface between the first and third material layers M1 and M3. A fourth light L4 having the incident angle smaller than the second angle $\theta 2$ transmits through the third material layer M3.

Figure 6:
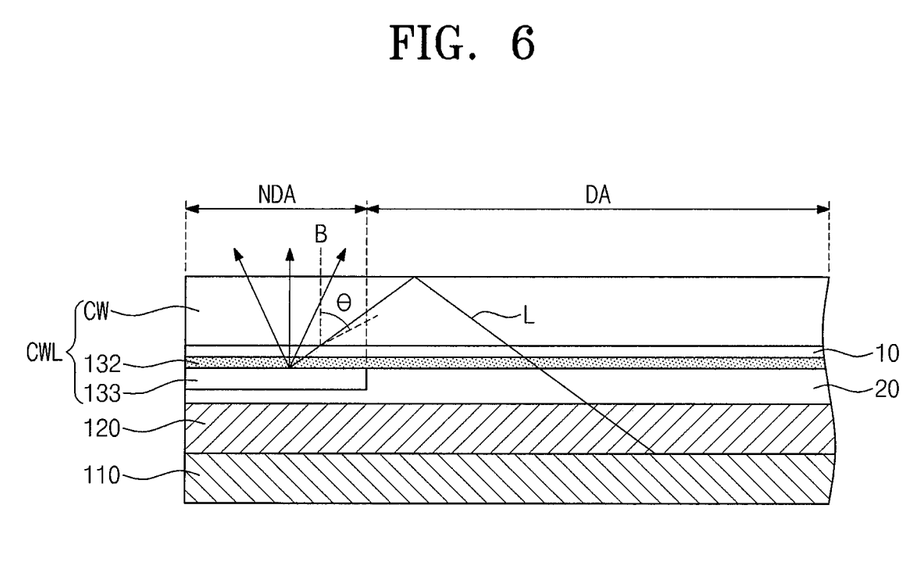
FIG. 6 is a cross-sectional view depicting refraction of light in a comparison window layer.
Figure 7:
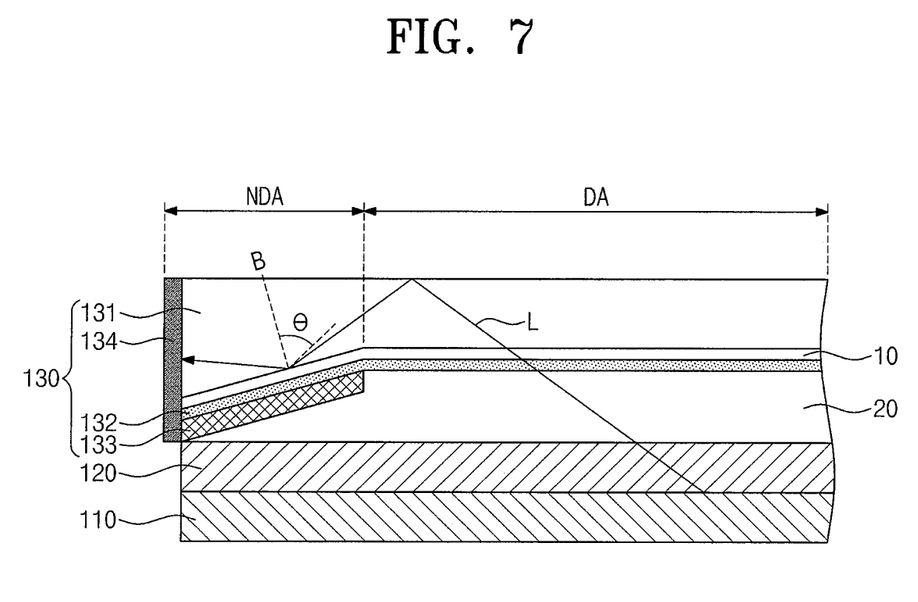
FIG. 7 is a cross-sectional view depicting refraction of light in a window layer of a display apparatus according to the first exemplary embodiment of the present disclosure.

FIG. 6 is a cross-sectional view depicting refraction of light in a comparison window layer CWL and FIG. 7 is a cross-sectional view depicting refraction of light in the window layer 130 of the display apparatus according to the first exemplary embodiment of the present disclosure.

For the convenience of explanation, the comparison window layer CWL shown in FIG. 6 and the window layer 130 shown in FIG. 7 include areas in which the decoration layer 133 is disposed.

The comparison window layer CWL shown in FIG. 6 has the same structure and function as the window layer 130 of FIG. 7 except for the slant surface SP and the light absorbing wall 134. Accordingly, features of the comparison window layer CWL that are different from those of the window layer 130 will be mainly described, and the elements of the comparison window layer CWL that are the same as the window layer 130 are assigned the same reference numerals.

Referring to FIG. 6, a comparison window CW of the comparison window layer CWL has a flat shape in a non-display area NDA rather than a slant surface. Accordingly, the comparison window CW, a base substrate 132, and the decoration layer 133 have a flat shape in the non-display area NDA and the comparison window CW and base substrate 132 have a flat shape in the display area DA.

The comparison window CW has a refractive index greater than a refractive index of air. An image light L provided to the comparison window CW from the display panel 110 is totally reflected at an upper surface of the comparison window CW, and is then provided to the non-display area NDA.

The refractive index of the comparison window CW in FIG. 6 is greater than a refractive index of a first adhesive member 10. In the comparison window CW of the non-display area NDA, an incident angle of the image light L is smaller than a critical angle $\theta$ in accordance with a difference in refractive index between the comparison window CW and the first adhesive member 10. Therefore, the image light L is provided to the decoration layer 133 after passing through the first adhesive member 10. The image light L is provided to the user after being scattered by the decoration layer 133. As a result, a light leakage phenomenon may occur.

Referring to FIG. 7, the window 131 and the first adhesive member 10 include the same materials as those of the comparison window CW and the first adhesive member 10 shown in FIG. 6. The refractive index of the window 131 is greater than the refractive index of the first adhesive member 10. The window 131 and the first adhesive member 10 in FIG. 7 have different shapes from those of the comparison window CW and the first adhesive member 10 shown in FIG. 6 (i.e., a slant surface).

An image light L provided to the window 131 from the display panel 110 in FIG. 7 occurs at the same angle as the image light L shown in FIG. 6. Thus, as described with respect to FIG. 6, the image light L in FIG. 7 is totally (or substantially totally) reflected by the window 131, and is then provided to the non-display area NDA.

Because the lower surface of the window 131 and the first adhesive member 10 in FIG. 7 include a slant surface SP in the non-display area NDA, the incident angle of the image light L in the window 131 of the non-display area NDA is greater than the critical angle $\theta$ in accordance with the difference in refractive index between the window 131 and the first adhesive member 10.

In addition, because the incident angle of the image light L in FIG. 7 is greater than the critical angle $\theta$ in the window 131 of the non-display area NDA, the image light L is totally reflected by the interface between the window 131 and the first adhesive member 10. As shown in FIG. 7, the totally-reflected image light L is provided to and absorbed by the light absorbing wall 134.

Thus, an amount of the light provided to the decoration layer 133 in the window layer 130 shown in FIG. 7 becomes smaller than that of the comparison window layer CWL shown in FIG. 6. That is, the lower surface of the window 131 and the first adhesive member 10 include the slant surface SP in the non-display area NDA, and thus the amount of the light provided to the decoration layer 133 may be reduced. As a result, the light leakage phenomenon is reduced.

Consequently, the display apparatus 100 according to the first exemplary embodiment may prevent or reduce the light leakage phenomenon from occurring in the non-display area NDA.

Figure 8:
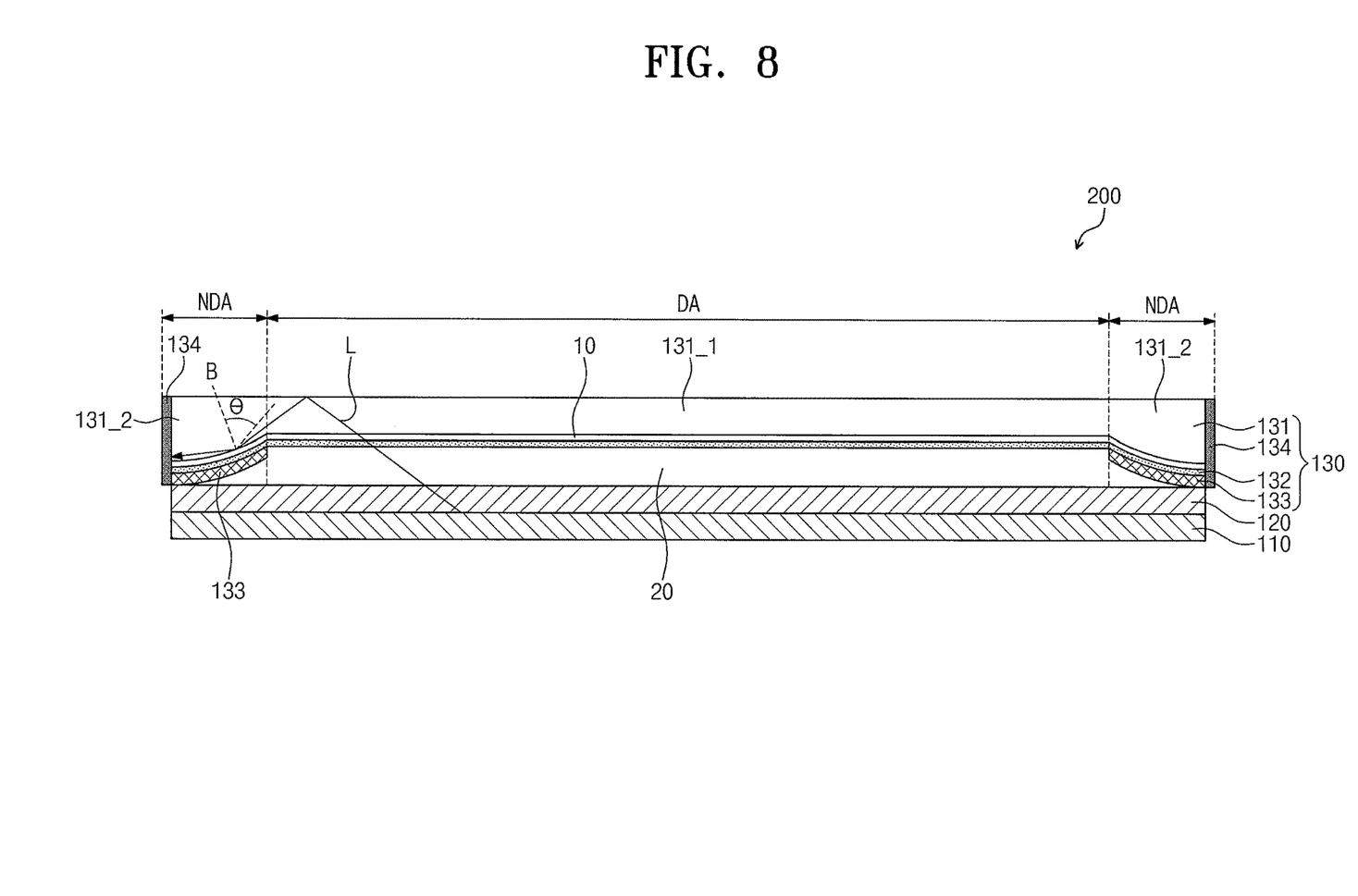
FIG. 8 is a cross-sectional view showing a display apparatus according to a second exemplary embodiment of the present disclosure.

FIG. 8 is a cross-sectional view showing a display apparatus 200 according to a second exemplary embodiment of the present disclosure.

For the convenience of explanation, FIG. 8 shows the cross-section of the display apparatus 200 corresponding to a section along the line I-I' shown in FIG. 2.

The display apparatus 200 according to the second exemplary embodiment has substantially the same structure and function as those of the display apparatus 100 according to the first exemplary embodiment except for the non-display area NDA. Accordingly, hereinafter, features of the display apparatus 200 that are different from those of the display apparatus 100 according to the first exemplary embodiment will be mainly described and the elements that are the same between the first and second exemplary embodiments are assigned with the same reference numerals.

Referring to FIG. 8, a window 131 includes a display part 131_1 in a display area DA and a non-display part 131_2 in a non-display area NDA. An upper surface of the display part 131_1 and an upper surface of the non-display part 131_2 are located at the same planar surface. The display part 131_1 has a flat shape and a lower surface of the non-display part 131_2 has a curved shape protruding towards a lower direction of the non-display part 131_2 as the non-display part 131_2 extends towards the light absorbing wall 134.

As shown in FIG. 8, a height of the lower surface of the non-display part 131_2 gradually increases as a distance from an edge of the lower surface of the non-display part 131_2 (e.g., adjacent the light absorbing wall 134) increases and a distance from the display part 131_1 decreases. Thus, the lower surface of the non-display part 131_2 has a convex shape protruding towards the lower direction.

In detail, the lower surface of the non-display part 131_2 adjacent to a boundary of the display part 131_1 may be referred to as an inner lower surface of the non-display part 131_2 and the lower surface of the non-display part 131_2 adjacent to an outer side surface of the window 131 may be referred to as an outer lower surface of the non-display part 131_2.

The outer lower surface of the non-display part 131_2 is located at a height lower than that of the inner lower surface of the non-display part 131_2. The height of the lower surface of the non-display part 131_2 becomes gradually higher from the outer lower surface of the non-display part 131_2 to the inner lower surface of the non-display part 131_2, and thus the lower surface of the non-display part 131_2 has a curved shape protruding towards the lower direction.

The base substrate 132 is attached to a lower portion of the window 131 by a first adhesive member 10. The first adhesive member 10 and the base substrate 132 have a flat shape in the display area DA and have substantially the same shape as that of the lower surface of the non-display part 131_2 in the non-display area NDA.

A decoration layer 133 is under the base substrate 132 in the non-display area NDA. The decoration layer 133 has substantially the same shape as that of the lower surface of the non-display part 131_2. A second adhesive member 20 is under the decoration layer 133 and the base substrate 132. A touch panel 120 is attached to the window layer 130 by the second adhesive member 20.

A light absorbing wall 134 has the same structure and function as those of the light absorbing wall 134 shown in FIG. 4, and thus details thereof will be omitted.

As with the first exemplary embodiment, the refractive index of the non-display part 131_2 is greater than a refractive index of the first adhesive member 10. In the case where the lower surface of the non-display part 131_2 has a curved shape protruding to the lower direction, an incident angle of an image light L may be greater than a critical angle θ in the window 131 of the non-display area NDA similar to the case where the lower surface of the non-display part 131_2 of the window 131 has a slant surface SP. Accordingly, the image light L is totally (or substantially totally) reflected at the interface between the window 131 and the first adhesive member 10 in the non-display area NDA and is absorbed by the light absorbing wall 134. As a result, an amount of the image light L traveling to the decoration layer 133 is reduced, and thus a light leakage phenomenon may be prevented from occurring or may be reduced.

Consequently, the display apparatus 200 according to the second exemplary embodiment may prevent or reduce the light leakage phenomenon from occurring in the non-display area NDA.

Figure 9:
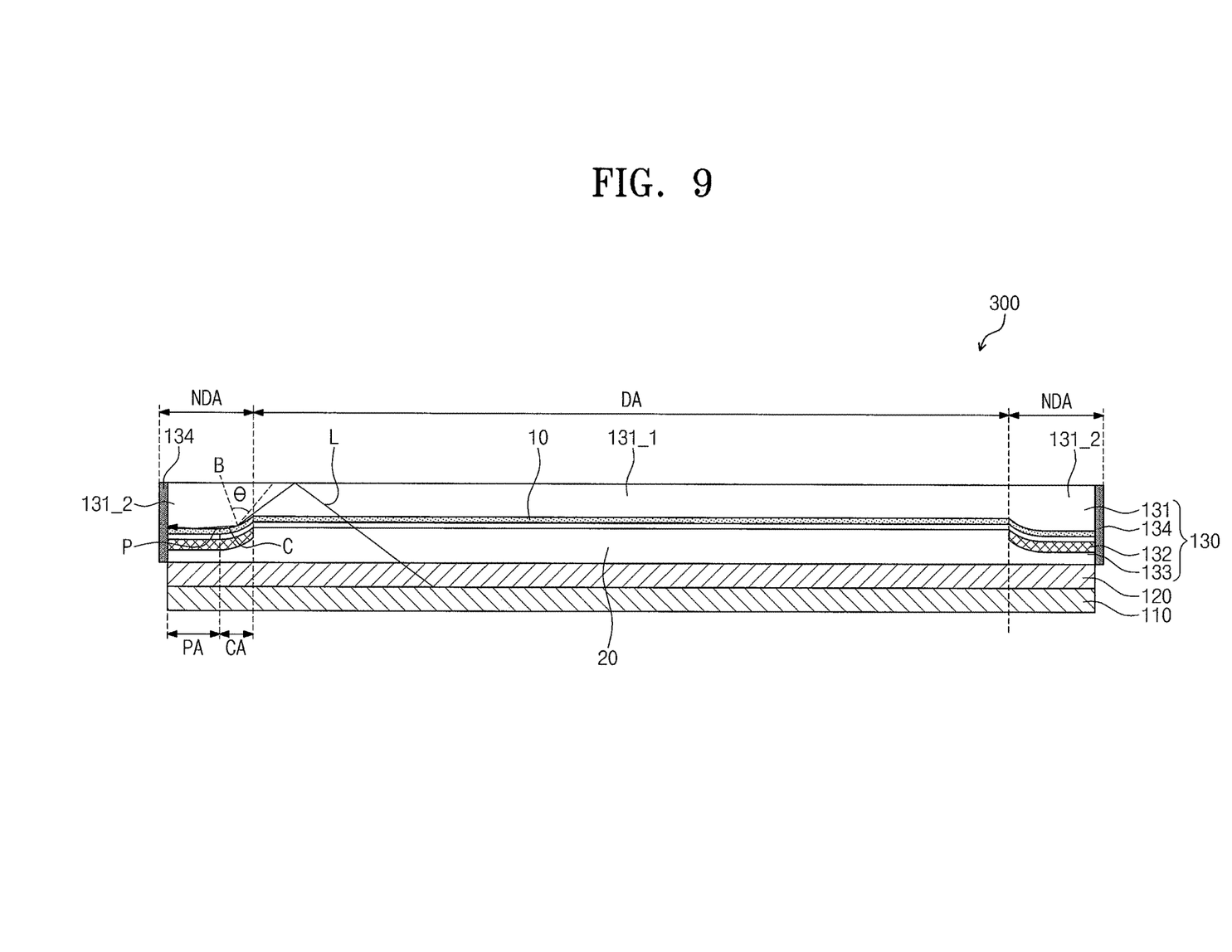
FIG. 9 is a cross-sectional view showing a display apparatus according to a third exemplary embodiment of the present disclosure.

FIG. 9 is a cross-sectional view showing a display apparatus 300 according to a third exemplary embodiment of the present disclosure.

For the convenience of explanation, FIG. 9 shows the cross-section of the display apparatus 300 corresponding to a section along the line I-I' shown in FIG. 2.

The display apparatus 300 according to the third exemplary embodiment has the same structure and function as those of the display apparatus 100 according to the first exemplary embodiment except for the non-display area NDA. Accordingly, hereinafter, features of the display apparatus 300 that are different from those of the display apparatus 100 according to the first exemplary embodiment will be mainly described and the elements that are the same as the first exemplary embodiment are assigned with the same reference numerals.

Referring to FIG. 9, a window 131 includes a display part 131_1 in a display area DA and a non-display part 131_2 in a non-display area NDA. An upper surface of the display part 131_1 and an upper surface of the non-display part 131_2 are located at the same planar surface.

The display part 131_1 has a flat shape. A lower surface of the non-display part 131_2 includes a planar surface portion P having a flat shape and a curved surface portion C between the planar surface portion P and the display part 131_1 and having a curved shape protruding towards a lower direction of the non-display part 131_2 (i.e., towards the planar surface portion P).

When viewed in a plan view, the curved surface portion C is in an area corresponding to about 40% of an area of the non-display part 131_2 and the planar surface portion P is in an area corresponding to about 60% of an area of the non-display part 131_2. That is, a ratio of a curved surface area CA, in which the curved surface portion C is disposed, to a planar surface area PA, in which the planar surface portion P is disposed, is 4:6.

Hereinafter, when viewed in a plan view, one side of the curved surface portion C adjacent to the planar surface portion P may be referred to as an outer side of the curved surface portion C and the other side of the curved surface portion C adjacent to the display part 131_1 may be referred to as an inner side of the curved surface portion C. The outer side of the curved surface portion C is located at a height lower than that of the inner side of the curved surface portion C.

A height of the outer side of the curved surface portion C is lower than a height of the inner side of the curved surface portion C. The height of the curved surface portion C becomes gradually higher from the outer side of the curved surface portion C towards the inner side of the curved surface portion C, and thus the curved surface portion C has a curved shape protruding towards a lower direction of the curved surface portion C.

A base substrate 132 is attached to a lower portion of the window 131 by a first adhesive member 10. The first adhesive member 10 and the base substrate 132 have a flat shape in the display area DA and have substantially the same shape as that of the lower surface of the non-display part 131_2 in the non-display area NDA. The refractive index of the non-display part 131_2 is greater than a refractive index of the first adhesive member 10.

In the non-display area NDA, a decoration layer 133 is under the base substrate 132. The decoration layer 133 has substantially the same shape as that of the lower surface of the non-display part 131_2. A second adhesive member 20 is under the decoration layer 133 and the base substrate 132. A touch panel 120 is attached to a window layer 130 by the second adhesive member 20.

In the present exemplary embodiment, a light absorbing wall 134 has the same structure and function as those of the light absorbing wall 134 shown in FIG. 4, and thus details thereof will be omitted.

As viewed relative to the comparison window layer CWL shown in FIG. 6, about 80% to about 90% of light leakage occurs in the area corresponding to about 40% of the area of the non-display area NDA near the boundary between the display area DA and the non-display area NDA (i.e., curved surface portion C). That is, most of the light leakage occurs in the area corresponding to about 40% of the area of the non-display area NDA from or near the boundary between the display area DA and the non-display area NDA.

Accordingly, when the curved surface portion C, in which the light leakage mainly occurs, has a curved shape protruding towards the lower direction of the curved surface portion C, the incident angle of the image light L may be greater than the critical angle θ in the curved surface area CA of the window 131. The image light L traveling to the curved surface area CA is totally reflected at the interface between the curved surface portion C and the first adhesive member 10. The image light L totally reflected by the curved surface portion C is totally reflected at the interface between the planar surface portion P and the first adhesive member 10, and then absorbed by the light absorbing wall 134. As a result, an amount of the light traveling to the decoration layer 133 is reduced, and thus the light leakage phenomenon may be prevented from occurring or may be reduced.

Consequently, the display apparatus 300 according to the third exemplary embodiment may prevent or reduce the light leakage phenomenon from occurring in the non-display area NDA.

Although the exemplary embodiments of the present invention have been described, it is understood that the present invention should not be limited to these exemplary embodiments and various changes and modifications can be made by one ordinary skilled in the art within the spirit and scope of the present invention as hereinafter claimed.

What is claimed is:

1. A display apparatus comprising:
   a display panel;
   a window over the display panel and comprising a display part and a non-display part surrounding the display part; and
   a decoration layer under the non-display part,
   wherein a lower surface of the non-display part of the window comprises a slant surface inclined from an outer lower edge of the window towards a portion of the lower surface of the non-display part adjacent to a boundary between the display part and the non-display part, and
   wherein at least a portion of the decoration layer is under the slant surface of the window, and
   wherein a portion of the window at the non-display part is thicker than a portion of the window at the display part.

2. The display apparatus of claim 1, wherein the decoration layer is substantially parallel to the slant surface of the lower surface of the non-display part.

3. The display apparatus of claim 1, further comprising:
   a base substrate under the window; and
   a first adhesive member attaching the base substrate to the window, wherein the decoration layer is under the base substrate to overlap with the non-display part.

4. The display apparatus of claim 3, wherein the base substrate is a flexible substrate having flexibility.

5. The display apparatus of claim 3, wherein the first adhesive member is on a lower surface of the window and has a uniform thickness, and the base substrate has substantially the same shape as the lower surface of the window and is attached to the lower surface of the window.

6. The display apparatus of claim 3, wherein the window has a refractive index greater than a refractive index of the first adhesive member.

7. The display apparatus of claim 3, wherein a portion of the first adhesive member overlapped with the non-display part and a portion of the base substrate have substantially the same shape as the slant surface of the lower surface of the non-display part.

8. The display apparatus of claim 3, further comprising a second adhesive member under the decoration layer and the base substrate, wherein the display panel is attached to the decoration layer and the base substrate by the second adhesive member.

9. The display apparatus of claim 8, wherein the second adhesive member has a lower surface that is flat.

10. The display apparatus of claim 8, wherein each of the first and second adhesive members is an optical clear adhesive.

11. The display apparatus of claim 8, further comprising a light absorbing wall on an outer side surface of the window, the base substrate, the decoration layer, and the first and second adhesive members.

12. The display apparatus of claim 11, wherein the light absorbing wall comprises a resin having a black color.

13. The display apparatus of claim 3, further comprising:
   a second adhesive member under the decoration layer and the base substrate; and
   a touch panel on the display panel, wherein the touch panel is attached to the decoration layer and the base substrate by the second adhesive member.

14. The display apparatus of claim 1, wherein the display part has a flat shape and an upper surface of the display part and an upper surface of the non-display part are located at a same planar surface.

* * * * *